(12) United States Patent
Matsuda

(10) Patent No.: US 7,292,252 B2
(45) Date of Patent: Nov. 6, 2007

(54) PROJECTION TYPE IMAGE DISPLAY SYSTEM, PROJECTOR, PROGRAM, INFORMATION STORAGE MEDIUM AND IMAGE PROJECTION METHOD CAPABLE OF AVOIDING OBSTACLES IN THE PROJECTION AREA

(75) Inventor: Hideki Matsuda, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/438,897

(22) Filed: May 16, 2003

(65) Prior Publication Data

US 2004/0036813 A1 Feb. 26, 2004

(30) Foreign Application Priority Data

May 20, 2002 (JP) .............................. 2002-144670
May 2, 2003 (JP) .............................. 2003-127026

(51) Int. Cl.
G09G 5/02 (2006.01)
G09G 5/373 (2006.01)
G09G 5/38 (2006.01)
H04N 9/31 (2006.01)

(52) U.S. Cl. ...................... 345/589; 345/667; 345/682; 348/745

(58) Field of Classification Search ........ 345/156–158, 345/619, 620, 660, 667, 672, 682, 589, 690; 348/581, 582, 578, 744, 745, 747; 353/30, 353/31
See application file for complete search history.

(56) References Cited

U.S. PATENT DOCUMENTS 4,950,069 A  8/1990  Hutchinson (Continued)

FOREIGN PATENT DOCUMENTS

EP  0 967 808 A2  12/1999

(Continued)

OTHER PUBLICATIONS

Rahul Sukthankar, Dynamic Shadow Elimination for Multi-Projector Displays, 2001, Proceedings of the 2001 IEEE Computer Society Conference on Computer Vision and Pattern Recognition, vol. 2, pp. II-151-II-157.*

(Continued)

Primary Examiner—Jeffery A Brier
(74) Attorney, Agent, or Firm—Oliff & Berridge, PLC

(57) ABSTRACT

To provide a projection type image display system, projector, program, information storage medium and image projection method which can project an image applicable to viewing environment of a changed projection position, a liquid crystal projector is provided with: a sensor for sensing a projection target area and outputting sensing information; an edge detection section for outputting detection information based on the sensing information; a projectable area determination section for determining a projectable area based on the detection information; a projection area selecting section for selecting a projection area from the projectable area; a sensing data generation section for generating sensing data applicable to viewing environment of the selected projection area, based on the sensing information of the selected projection area; an LUT data generation section for generating LUT data; a correction section for correcting image information based on the generated LUT data; and an image projection section for projecting an image onto the projection area based on the corrected image information.

18 Claims, 5 Drawing Sheets

U.S. PATENT DOCUMENTS

| | | | |
|---|---|---|---|
| 5,040,116 A | | 8/1991 | Evans, Jr. et al. |
| 5,231,481 A | | 7/1993 | Eouzan et al. |
| 5,375,177 A | * | 12/1994 | Vaidyanathan et al. ..... 382/291 |
| 5,436,639 A | * | 7/1995 | Arai et al. ................... 345/156 |
| 5,563,988 A | | 10/1996 | Maes et al. |
| 6,005,534 A | * | 12/1999 | Hylin et al. ................... 345/2.1 |
| 6,167,167 A | * | 12/2000 | Matsugu et al. ............ 382/283 |
| 6,394,557 B2 | * | 5/2002 | Bradski ....................... 382/103 |
| 6,575,581 B2 | * | 6/2003 | Tsurushima .................. 353/30 |
| 2003/0025649 A1 | * | 2/2003 | Wynne Wilson ............... 345/6 |

FOREIGN PATENT DOCUMENTS

| | | |
|---|---|---|
| EP | 1 065 560 A1 | 1/2001 |
| EP | 1 117 080 A2 | 7/2001 |
| JP | A-07-162743 | 6/1995 |
| JP | A-2000-305481 | 11/2000 |
| JP | A 2002-229546 | 8/2002 |
| JP | A-2002-229546 | 8/2002 |
| JP | A 2002-281520 | 9/2002 |
| JP | A 2002-311503 | 10/2002 |
| JP | A-2003-283964 | 10/2003 |

OTHER PUBLICATIONS

Ramesh Raskar, Multi-Projector Displays Using Camera-Based Registration, Oct. 24-29, 1999, Proceedings Visualization, pp. 161-168 and 522.*

D. Hall, MagicBoard: A Contribution to an Intelligent Office Environment, 1999, http://citeseer.ist.psu.edu/hall99magicboard.html, pp. 1-9.*

U.S. Appl. No. 10/438,896, filed May 16, 2003, Hideki Matsuda.

* cited by examiner

PROJECTION TYPE IMAGE DISPLAY SYSTEM, PROJECTOR, PROGRAM, INFORMATION STORAGE MEDIUM AND IMAGE PROJECTION METHOD CAPABLE OF AVOIDING OBSTACLES IN THE PROJECTION AREA

Japanese Patent Application No. 2002-144670, filed on May 20, 2002 and Japanese Patent Application No. 2003-127026, filed on May 2, 2003, are hereby incorporated by reference in their entirety.

BACKGROUND OF THE INVENTION

The present invention relates to a projection type image display system, projector, program, information storage medium and image projection method which can change a projection position.

Projection type image display systems such as liquid crystal projectors and the like have been used in classrooms, movie theaters, meeting rooms, exhibition grounds and domestic living rooms.

When an image is projected using a liquid crystal projector or the like and if there is an obstacle between an image projecting section and a projection plane, the image will not well been viewed by the obstacle on which the projected light impinges or which obstructs the view.

For example, a domestic living room is usually used not only by the user of a liquid crystal projector or the like, but also by the user's family. Even if the user has secured any larger area of wall surface as a projection area, anyone of his or her family may place a furniture or houseplant in front of that wall surface such that the furniture or houseplant will hide part of the projection area intended by the user.

Moreover, if a liquid crystal projector or the like is used to project a product introduction image or an advertisement image in an exhibition ground or the like, the image may be partially hidden behind any person who has unintentionally entered the projection area.

In such a case, it is usual that the user moves the liquid crystal projector or the like or changes the direction of projection from the liquid crystal projector or the like to avoid the obstacle and to project the image properly. However, the movement of the liquid crystal projector or the like is troublesome while at the same time, the calibration must be tried again.

When the liquid crystal project or the like is used to project an image, moreover, the user may want to project the image onto the desired portion of the projection area depending on the situation in the projection.

For example, in a room into which a living room and kitchen are unified, the user may usually project an image onto the wall of the living room and sometimes want to project another image illustrating a recipe onto the wall of the kitchen.

For presentation, a right-handed presenter may more easily point an image through a pointer when the image is displayed on the right side as viewed from audience while a left-handed presenter may more easily point the image through the pointer when the image is displayed on the left side as viewed from the audience.

In such a case, it is preferred that the user shifts the image projection position to perform a more effective presentation. However, it takes time that the projector is manually adjusted in projection position and re-calibrated each time when one presenter is replaced by another.

In order to display an image intended by the user, furthermore, it is necessary that the color and brightness of an image are corrected in consideration of the influences of ambient light (illuminating light or sunlight) and projection plane.

In recent years, the partial illumination has been adopted even in home. If the projection position has been changed without change of the settings in the liquid crystal projector or the like, therefore, the image appearance intended by the user may be highly varied since the influence of the ambient light to the image is variable depending on the projection position.

BRIEF SUMMARY OF THE INVENTION

The present invention is made in view of the above-mentioned problems and may provide a projection type image display system, projector, program, information storage medium and image projection method which can easily change projection position.

According to a first aspect of the present invention, there is provided a projection type image display system and a projector each of which comprising:

a sensing means for sensing a projection target area and outputting sensing information;

a detection means for performing edge detection based on the sensing information and outputting detection information which indicates edge in a sensed image or color distribution in a sensed image;

in alternative embodiments, the detection means of the projection type image display system and the projector is for performing color distribution detection based on the sensing information and outputting detection information which indicates color distribution in the sensed image;

a projectable area determination means for determining a projectable area having no obstacle in the projection target area, based on the detection information;

a projection area selection means for selecting a projection area from the projectable area, based on selection by a user or a predetermined criterion;

an adjustment means for adjusting input image information such that an image is displayed on the projection area, and an image projection means for projecting an image onto the projection area based on the adjusted input image information.

According to a second aspect of the present invention, there is provided a projection type image display system and a projector each of which comprising:

a sensing section which senses a projection target area and outputs sensing information;

a detection section which performs edge detection based on the sensing information and outputting detection information which indicates edge in a sensed image or color distribution in a sensed image;

in alternative embodiments, the detection section of the projection type image display system and the projector is for performing color distribution detection based on the sensing information and outputting detection information which indicates color distribution in the sensed image;

a projectable area determination section which determines a projectable area having no obstacle in the projection target area, based on the detection information;

a projection area selection section which selects a projection area from the projectable area, based on selection by a user or a predetermined criterion;

an adjustment section which adjusts input image information such that an image is displayed on the projection area; and an image projection section which projects an image onto the projection area based on the adjusted input image information.

According to a third aspect of the present invention, there is provided a computer-readable program which causes a computer to function as:

a sensing means for sensing a projection target area and outputting sensing information;

a detection means for performing edge detection based on the sensing information and outputting detection information which indicates edge in a sensed image or color distribution in the-a sensed image;

in alternative embodiments, the detection means of the computer-readable program is for performing color distribution detection based on the sensing information and outputting detection information which indicates color distribution in the sensed image;

a projectable area determination means for determining a projectable area having no obstacle in the projection target area, based on the detection information;

a projection area selection means for selecting a projection area from the projectable area, based on selection by a user or a predetermined criterion;

an adjustment means for adjusting input image information such that an image is displayed on the projection area; and an image projection means for projecting an image onto the projection area based on the adjusted input image information.

According to a fourth aspect of the present invention, there is provided an information storage medium storing a computer-readable program which causes a computer to function as:

a sensing means for sensing a projection target area and outputting sensing information;

a detection means for performing edge detection based on the sensing information and outputting detection information which indicates edge in a sensed image or color distribution in a sensed image;

in alternative embodiments, the detection means of the information storage medium is for performing color distribution detection based on the sensing information and outputting detection information which indicates color distribution in the sensed image;

a projectable area determination means for determining a projectable area having no obstacle in the projection target area, based on the detection information;

a projection area selection means for selecting a projection area from the projectable area, based on selection by a user or a predetermined criterion;

an adjustment means for adjusting input image information such that an image is displayed on the projection area; and an image projection means for projecting an image onto the projection area based on the adjusted input image information.

According to a fifth aspect of the present invention, there is provided an image projection method comprising:

sensing a projection target area to output sensing information;

performing edge detection based on the sensing information and outputting detection information which indicates edge in a sensed image or color distribution in a sensed image;

in alternative embodiments, the detection means of the image projection method is for performing color distribution detection based on the sensing information and outputting detection information which indicates color distribution in the sensed image;

determining a projectable area having no obstacle in the projection target area, based on the detection information;

selecting a projection area from the projectable area based on user selection or a predetermined criterion;

adjusting input image information such that an image is displayed on the projection area; and projecting an image onto the projection area based on the adjusted input image information.

In the projection type image display systems and the like according to the present invention, a user can more easily change the projection position since the projectable area including no obstacle (e.g., a desk, audience or the like) can automatically be determined.

Each of the projection type image display systems and projectors may further comprise:

an image colon data generation means for generating image correction data used to correct an image depending on viewing environment, based on the sensing information; and a correction means for correcting the input image information adjusted by the adjustment means, based on the image correction data, wherein the image projection means projects an image onto the projection area based on the input image information corrected by the correction means.

Each of the program and information storage medium may further causes a computer to function as:

an image correction data generation means for generating image correction data used to correct an image depending on viewing environment, based on the sensing information; and a correction means for correcting the input image information adjusted by the adjustment means, based on the image correction data, wherein the image projection means projects an image onto the projection area based on the input image information corrected by the correction means.

The image projection method may further comprise:

generating image correction data used to correct an image depending on viewing environment, based on the sensing information;

correcting the input image information based on the image correction data; and projecting an image onto the projection area based on the input image information corrected by the correction means.

Thus, in the projection type image display systems and the like, an image can be corrected depending on viewing environment of the projection position by generating the image correction data based on the result of sensing of the projection target area and using the image correction data to correct the input image information.

In each of the projection type image display systems, projectors, program and information storage medium, the image correction data generation means may detect viewing environment of the projection area and generate the image correction data, based on the sensing information of the projection area selected by the projection area selection means.

The image projection method may further comprise detecting viewing environment of the projection area and generating the image correction data, based on the sensing information of the selected projection area.

Thus, in the projection type image display system and the like, an image view can be kept constant by correcting the image depending on viewing environment of the projection position even if the projection position is changed.

In each of the projection type image display system, projector, program and information storage medium, the image projection means may have a spatial light modulator; and the adjustment means may associate the projection target area based on the sensing information with a pixel area of the spatial light modulator to adjust the input image information so that at least one of the position and size of an image is adjusted.

The image projection method may further comprise associating the projection target area based on the sensing information with a pixel area of a spatial light modulator adjust at least one of the position and size of an image.

Thus, in the projection type image display systems and the like, an image can be projected with its appropriate size since the association of the projection target area with the pixel area of the spatial light modulator can automatically carried out.

In each of the projection type image display systems, projectors, program and information storage medium, the sensing means may repeatedly perform the sensing operation at a predetermined timing and output the sensing information;

the detection means may output the detection information based on the newest sensing information; and the projectable area determination means may determine the projectable area based on the newest detection information.

The image projection method may further comprise:

repeatedly performing the sensing operation and outputting the detection information at a predetermined timing, and determining the projectable area based on the newest detection information.

If the position or the like, of an obstacle is changed (or if the projection area is hidden by audience, for example), the projection type image display systems and the like according to the present invention enables to perform automatic adjustment to project an image on the projection area having no obstacles by repeating the sensing and edge detection at a predetermined timing. So a user can more easily change the projection position.

DETAILED DESCRIPTION OF THE EMBODIMENT

The present invention applied to a projection type image display system that uses a liquid crystal projector is described below by way of example, with reference to the accompanying drawings. Note that the embodiment described below do not in any way limit the scope of the present invention defined by the claims laid out herein. Similarly, all the elements of the embodiment below should not be taken as essential requirements defined by the claims herein.

System Configuration

There will be described a case when a liquid crystal projector is arranged in a domestic living room to project an image onto the wall.

Figure 1:
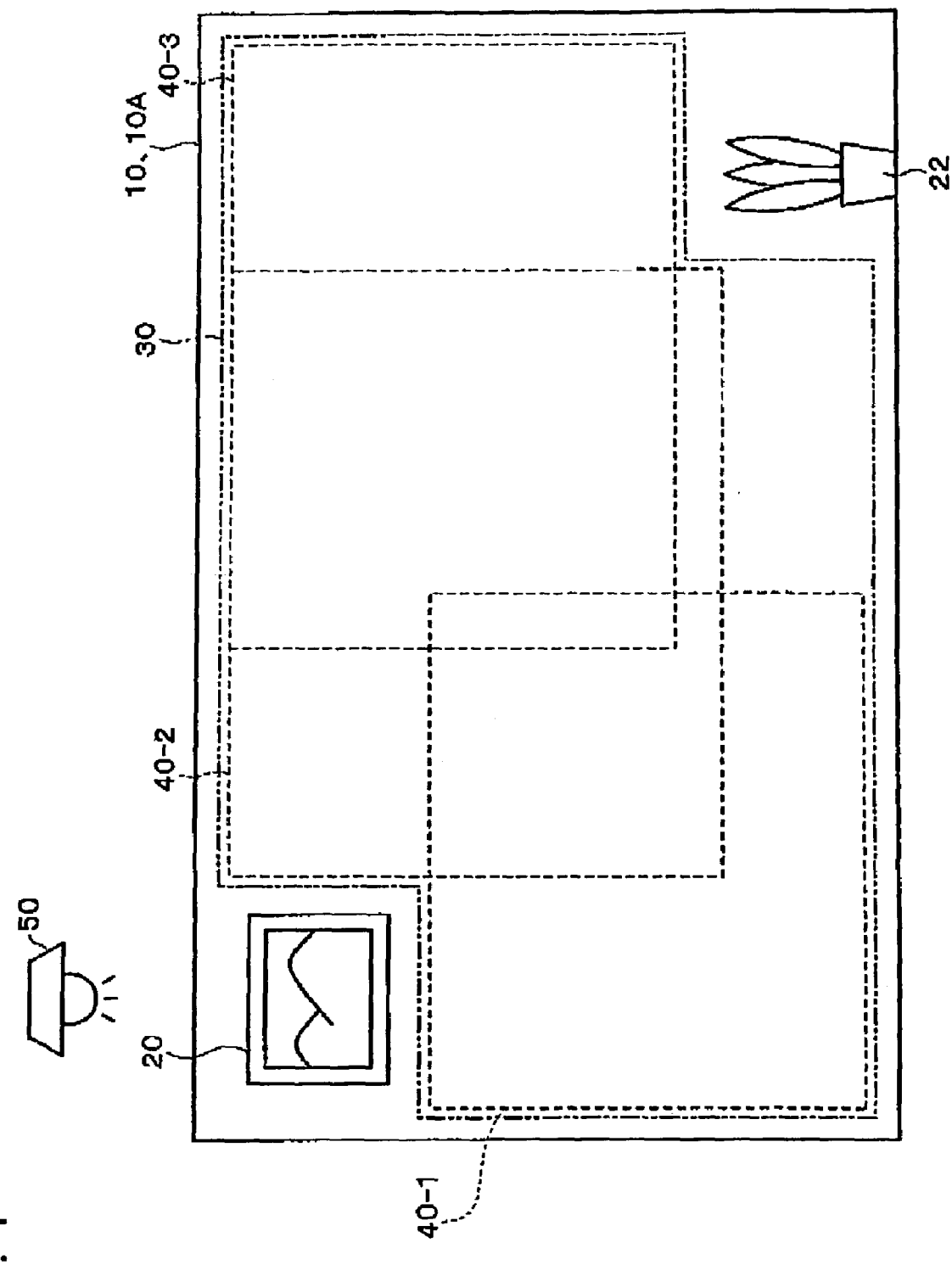
FIG. 1 is a schematic diagram showing a projection area according to one embodiment of the present invention.

FIG. 1 is a schematic diagram showing a projection area according to one embodiment of the present invention.

When the wall is used as a projection target area 10 onto which an image is projected and if any obstacle such as a picture 20, a foliage plant 22 or the like, the wall may be hidden behind the obstacle. Thus, the liquid crystal projector may not adequately display an image.

In particular, because the living room is used by a plurality of members in the family, the picture 20 and/or foliage plant 22 may frequently be moved by any of the members. It is therefore difficult to secure the projection area adequately at all times.

Moreover, the image appearance is variable depending on the position of a fluorescent lamp 50. In recent years, the partial illumination of a fluorescent lamp has been used in homes. Thus, the image appearance is variable depending on the position onto which the liquid crystal projector projects an image in the living room.

The liquid crystal projector according to this embodiment senses the projection target area 10 through a CCD sensor for performing edge detection, determines a plurality of projection areas 40-1 to 40-3 which satisfy a predetermined aspect ratio and decides one of the projection areas 40 on selection of the user to project an image thereonto.

Furthermore, the liquid crystal projector according to this embodiment realizes an ideal image appearance by correcting the color and brightness of the image in consideration of the influence of an ambient light (an illuminating light from the fluorescent lamp 50 or sunlight) in a viewing environment (or an environment under which the image is actually viewed under the influence of the light from the fluorescent lamp 50 as well as the influence of the color in the projection area) and the influence of the projection plane (such as the color of the projection area, spectral reflection factor and the like).

Thus, the user can reproduce an ideal image appearance even if the image projection position has been changed.

Functional Blocks

Functional blocks in a projection type image display system included in a liquid crystal projector for realizing the aforementioned functions will be described below.

Figure 2:
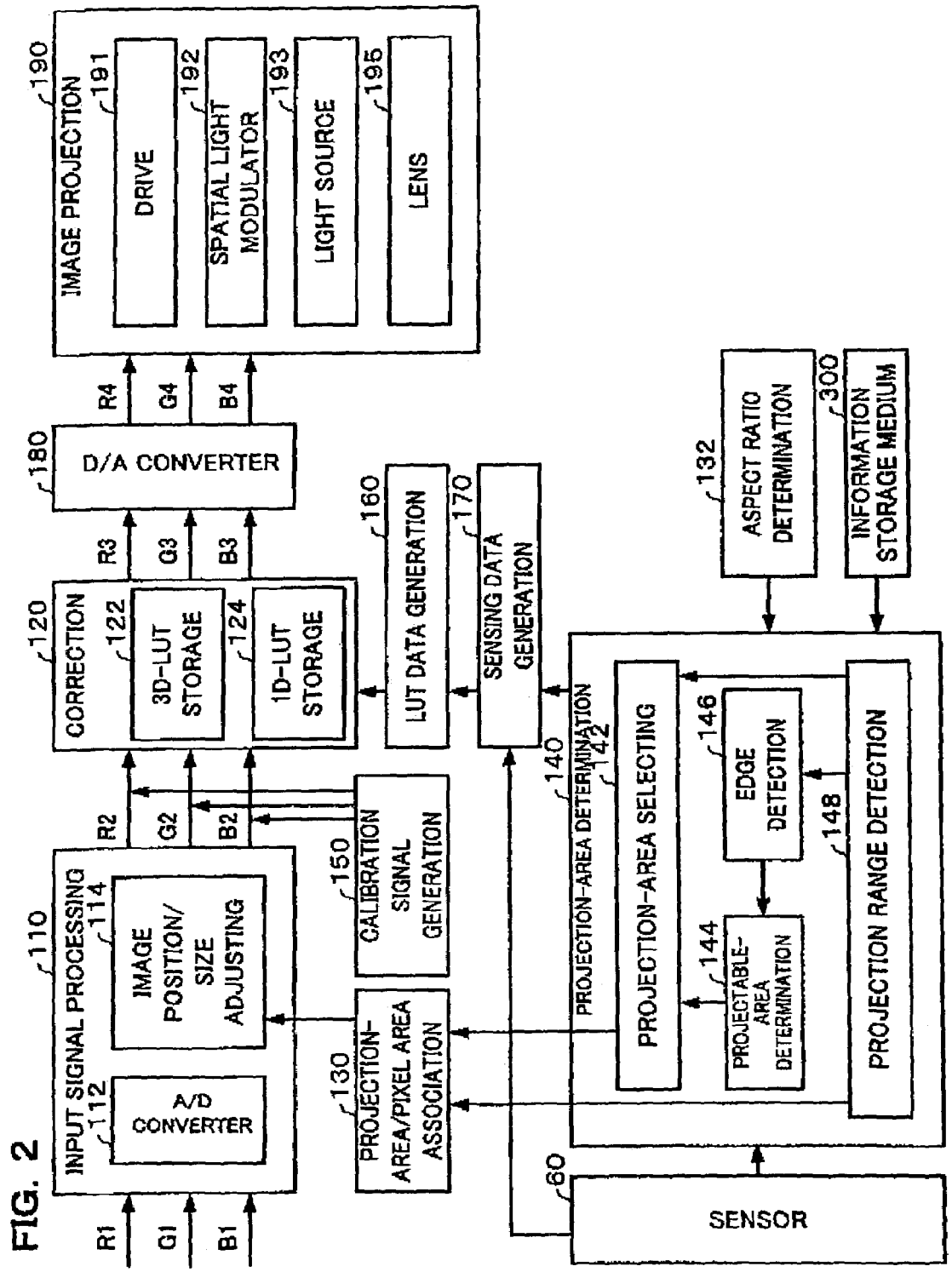
FIG. 2 is a functional block diagram showing a projection type image display system in a liquid crystal projector according to one embodiment of the present invention.

FIG. 2 is a functional block diagram showing a projection type image display system in a liquid crystal projector according to one embodiment of the present invention.

The projection type image display system comprises a sensor 60, an input signal processing section 110, a correction section 120, a D/A converter section 180, an image projection section 190, a projection-area-to pixel area association section 130, a projection area determination section 140, a calibration signal generation section 150, a sensing data generating section 170, an LUT data generation section 160 and an aspect-ratio determination section 132.

The input signal processing section 110 converts R1-, G1- and B1-signals constituting analog R-, G- and B-signals which are a kind of input image information from PC (Personal Computer) or the like into digital R2-, G2- and B2-signals.

The input signal processing section 110 comprises an A/D converter section 112 for performing such an analog to digital conversion and an image position/size adjustment section 114 which is part of an adjustment means for adjusting the position and size of the image (which may adjust only the position or size of the image).

However, the A/D converter section 112 and D/A converter section 180 are unnecessary if only digital type R-, G- and B-signals are used in the projection type image display system.

The calibration signal generation section 150 generates digital R2-, G2- and B2-signals for projection of calibration images.

In such a manner, the calibration can be made solely by the liquid crystal projector by internally generating calibration signals within the liquid crystal projector without inputting calibration signals from any external input device such as a PC or the like into liquid crystal projector. The calibration image signals may be inputted from PC or the like directly into the projector 20 without provision of the calibration signal generation section 150.

The correction section 120 comprises a 3D-LUT (three-dimensional lookup table) storage section 122 and a 1D-LUT (one-dimensional lookup table) storage section 124. The correction section 120 corrects the color of an image using 3D-LUT and the brightness of the image using 1D-LUT. 3D-LUT and 1D-LUT are kinds of image correction data. The image correction data may be in the form of a matrix, for example.

The correction section 120 corrects the color, brightness and the like of the image to form output R3-, G3- and B3-signals, based on the R2-, G2- and B2-signals from the input signal processing section 110 or the calibration signal generation section 150.

The D/A converter section 180 converts the R3-, G3- and B3-signals from the correction section 120 into analog R4-, G4- and B4-signals.

The image projection section 190 comprises a drive section 191, a spatial light modulator 192 and a source of light 193 and a lens 195.

The drive section 191 drives the spatial light modulator 192 based on the R4-, G4- and B4-signals from the D/A converter section 180. The image projection section 190 projects the light from the light source 193 through the spatial light modulator 192 and lens 195.

In this embodiment, furthermore, the projection area decision region 140 included in the liquid crystal projector comprises a projection area selecting section 142, a projectable area determination section 144, an edge detection section 146 and a projection-range detection section 148.

The projection-range detection section 148 detects the range of the projection target area 10 (which will also be referred to the projection range 10A), based on sensing information represented by X-, Y- and Z-values (tristimulus values of XYZ) from the sensor 60 which is a sensing means for sensing the projection target area 10. The X-, Y- and Z-values used herein are machinery independence colors which are based on the International Standard defined by the International Commission on Illumination (CIE).

For convenience, FIG. 1 shows the projection target area 10 which has the same size as the projection range 10A. Moreover, the projection range 10A is intended to indicate the range in the projection target area 10 irradiated by a projection light.

The edge detection section 146 performs the edge detection and outputs detection information, based on the X-, Y- and Z-values of the whole projection range 10A on the projection target area 10.

The projectable area determination section 144 determines projection areas 40-1 to 40-3 which have no obstacle such as picture 10 or the like within the projection range 10A on the projection target area 10 and also which have a size equal to or larger than a fixed size satisfying the aspect ratio, based on the detection information and an aspect ratio determined by the aspect-ratio determination section 132 (for example, 16:9, 4:3 or the like). For simplicity, FIG. 1 shows three representative projection areas 40-1 to 40-3, but more projection areas 40 can actually be determined. Moreover, only one projection area may be determined. The projectable area determination section 144 detects a portion of the projection area surrounded by a boarder line on the outermost side thereof as a projectable area 30.

If there is any projection area which does not overlap with other projection areas, a plurality of projectable areas 30 may be detected.

The projection area selecting section 142 selects one of the projection areas 40-1 to 40-3 contained in the projectable area 30 according to user's instruction of selection (e.g., through a remote controller in the liquid crystal projector).

The projection-area-to-pixel area association section 130, which is part of the adjusting means, associates the projection area in the projection range 10A on the projection target area 10 with the pixel area of the spatial light modulator 192, based on the projection range 10A on the projection target area 10 detected by the projection-range detection section 148 and the projection area selected by the projection area selecting section 142. More particularly, the projection-area-to-pixel area association section 130 determines a ratio between the projection range 10A on the projection target area 10 and the pixel area of the spatial light modulator 192.

In place of this technique, the projection-area-to-pixel area association section 130 may associate coordinates within the projection range 10A (or coordinates on a light-receiving element in the sensor 60). This is because the coordinates on the projected image can be transformed into coordinates on the pixel area of the spatial light modulator 192 through a predetermined transformation.

The relationship between a pixel in the projected image and a pixel portion of the spatial light modulator 192 has been known by the image projection section 190.

The image position/size adjustment section 114 adjusts the input image information to regulate the position and size of the image, based on the ratio determined by the projection-area-to-pixel area association section 130 and the positional information in the projection range 10A on the projection target area 10 in the projection area selected by the projection area selecting section 142.

Furthermore, the liquid crystal projector according to this embodiment comprises a sensing data generation section 170 for computing the mean value in the projection area from X-, Y- and Z-values for each pixel from the sensor 60 when a plurality of calibration images are projected, to correct the influence of the ambient light, and a LUT data generation section 160 for updating or generating 3D-LUT stored in the 3D-LUT storage section 122 and 1D-LUT stored in the 1D-LUT storage section 124, based on X-, Y- and Z-values for each calibration image.

The sensing data generation section 170 computes the mean value of X-, Y- and Z-values of pixels in the projection area, based on the sensing information from the sensor 60 and information indicating the projection area from the projection area determination section 140.

The LUT data generation section 160, which is an image correction data generating means, then generates 3D-LUT and 1D-LUT based on the computed mean value. The LUT data generation section 160 may generate the image correction data corresponding to a device using a device profile which has been held in the LUT data generation section 160.

In such a manner, the image information can be corrected depending on the viewing environment in the projection area by generating the image correction data based on the mean value of the X-, Y- and Z-values which is sensing information for each of the pixels forming the projection area.

Flow of Image Processing

A flow of image processing with the use of these sections and portions will now be described in connection with a flow chart.

Figure 3:
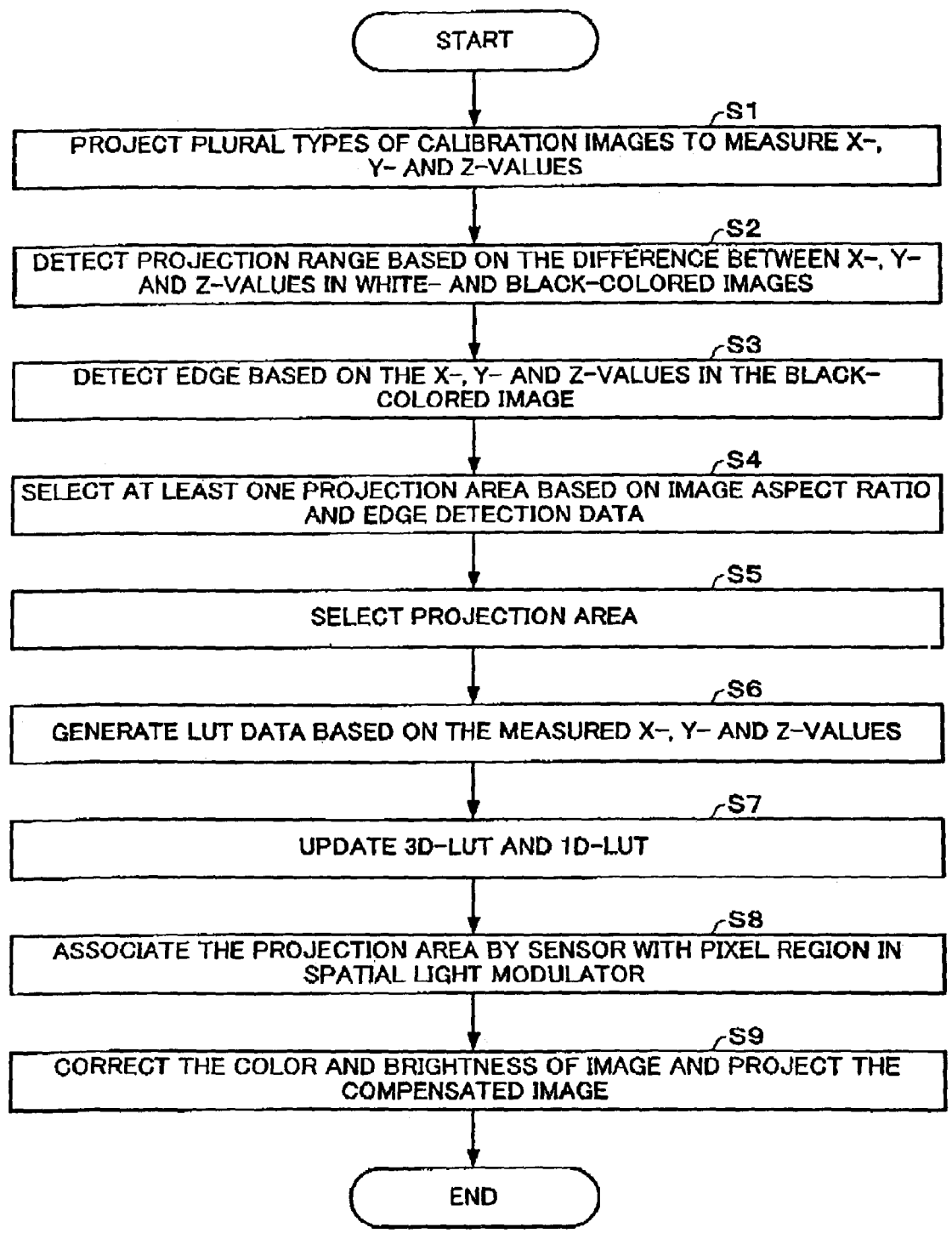
FIG. 3 is a flow chart showing an image projecting procedure according to one embodiment of the present invention.

FIG. 3 is a flow chart showing an image projecting procedure according to one embodiment of the present invention.

First of all, the calibration signal generation section 150 produces calibration signals so that a plurality of single-colored calibration images (for example, white-, red-, green-, blue, gray- and black-colored calibration images) will be displayed; the correction section 120 corrects color temperature and the like on the basis of normal liquid crystal projector settings; and the image projection section 190 sequentially projects the calibration images based on the corrected image information.

The sensor 60 measures X-, Y- and Z-values of each pixel (or a pixel in sensor 60 used to output the calibration image measurement through the sensor 60) in outputs measured value of the calibration image) in a calibration image displayed on the projection target area 10 (step S1).

The projection-range detection section 148 then detects the projection range 10, based on the difference for each pixel between X-, Y- and Z-values when the white-colored calibration image is displayed and X-, Y- and Z-values when the black-colored calibration image is displayed (step S2). In this case, it is preferably assumed, for example, that pixels having the difference equal to or more than 5 cd/m$^2$ are included in the projection range 10A on the projection target area 10. In place of the sensing information (X-, Y- and Z-values) when the black-colored calibration image is displayed, the sensing information in the projection range 10A on the projection target area 10 when the black-colored calibration image is not displayed may be used.

The edge detection section 146 performs the edge detection, based on the X-, Y- and Z-values measured when the black-colored calibration image is displayed (step S3). More particularly, the edge detection section 146 is based on the X-, Y- and Z-values of the pixel in the projection range 10A detected by the projection-range detection section 148.

The projectable area determination section 144 then determines a projectable area 30 (i.e., an area including at least one projection area), based on the image aspect ratio from the aspect-ratio determination section 132 and the edge detection data from the edge detection section 146. More particularly, the projectable area determination section 144 detects the edge detection data in the projection range 10A from its left and upper location to its right and lower location to specify an area which satisfies a desired aspect ratio (i.e., one projection area). For example, if there is a polygon-shaped projectable area 30 as shown in FIG. 1, a plurality of projection areas 40-1 to 40-3 will be selected (step S4).

The projection area determination section 140 outputs information indicative of these projection areas 40-1 to 40-3 selected by the projectable area determination section 144 toward the input signal processing section 110; and the image projection section 190 projects a selecting image for causing a user to select one of the projection areas 40-1 to 40-3. In this case, the input signal processing section 110 may have stored image information used to generate the selecting image.

The projection area selecting section 142 then selects one of the projection areas 40-1 to 40-3, based on a predetermined criterion (for example, it is at the upper end, lower end, left end or right end) or a user's instruction (step S5).

The sensing data generation section 170 computes the mean value of X-, Y- and Z-values of each of the pixels forming the projection area in each calibration image, based on the sensing information from the sensor 60 and information indicating the projection area from the projection area determination section 140. Moreover, the LUT generating section 160 generates 3D-LUT and 1D-LUT based on the computed mean value (step S6) and updates the LUT data by storing them in the 3D-LUT and 1D-LUT storage sections 122, 124, respectively (step S7).

The projection-area-to-pixel area association section 130 then associates the projection area with the pixel area of the spatial light modulator 192 (step S8). In this case, the image may be resized so that the entire range of the image represented by the image signals is projected onto the selected projection area. Alternatively, the image may be trimmed so that part of the image represented by the image signals is projected onto the selected projection area.

The image position/size adjustment section 114 then uses this association to adjust the digitally converted input image signals so that the position and size of the image will be adjusted and outputs digital signals (R2, G2, B2).

Furthermore, the correction section 120 uses these digital signals (R2, G2, B2) to correct the image information so that the image takes the color and brightness corresponding to the viewing environment on the projection area; and the D/A converter section 180 performs the digital conversion against the image information (R3, G3, B3) from the correction section 120 and outputs analog signals (R4, G4, B4).

The drive section 191 then chives the spatial light modulator 192 based on these analog signals (R4, G4, B4); and the image projection section 190 outputs a light from the light source 193 through the spatial light modulator 192 and lens 195 to project the image.

In such a manner, the image projection section 190 can project the image corrected relating to its color and brightness onto the projection,area (step S9).

As described, this embodiment can permit the user to change the projection position in a more simple and easy manner since the liquid crystal projector can automatically determine any suitable projectable area 30 on which there is no obstacle (for example, desk, audience or the like).

For presentation, a right-handed presenter may more easily point an image through a pointer when the image is displayed on the right side as viewed from audience while a left-handed presenter may more easily point the image through the pointer when the image is displayed on the left side as viewed from the audience.

Even in such a case, this embodiment permits the user to project the image onto any preferred position without need of any manual adjustment for the projector's projection position.

According to this embodiment, furthermore, the liquid crystal projector can project the image after the color and brightness thereof have been corrected for the viewing environment of the projection area selected from the projectable area by generating the sensing data from the computed mean values of the X-, Y- and Z-values of each of the pixels forming the projection area in each calibration image, based on the sensing information from the sensor 60 and the information indicative of the projection area from the projection area determination section 140 and by using the image correction data generated based on this sensing data.

Thus, the liquid crystal projector can more simply and easily change the projection position, for example, even if the projection area 40 is continuously changed for display, since no calibration must be re-tried each time when the projection area is change.

According to this embodiment, furthermore, the liquid crystal projector can project the image with its appropriate size onto an appropriate position since the association of the projection range 10A on the projection target area 10 with the pixel area in the spatial light modulator 192 can automatically be carried out.

Hardware Configuration

For example, the following things can be applied to the respective hardware parts above mentioned.

Figure 4:
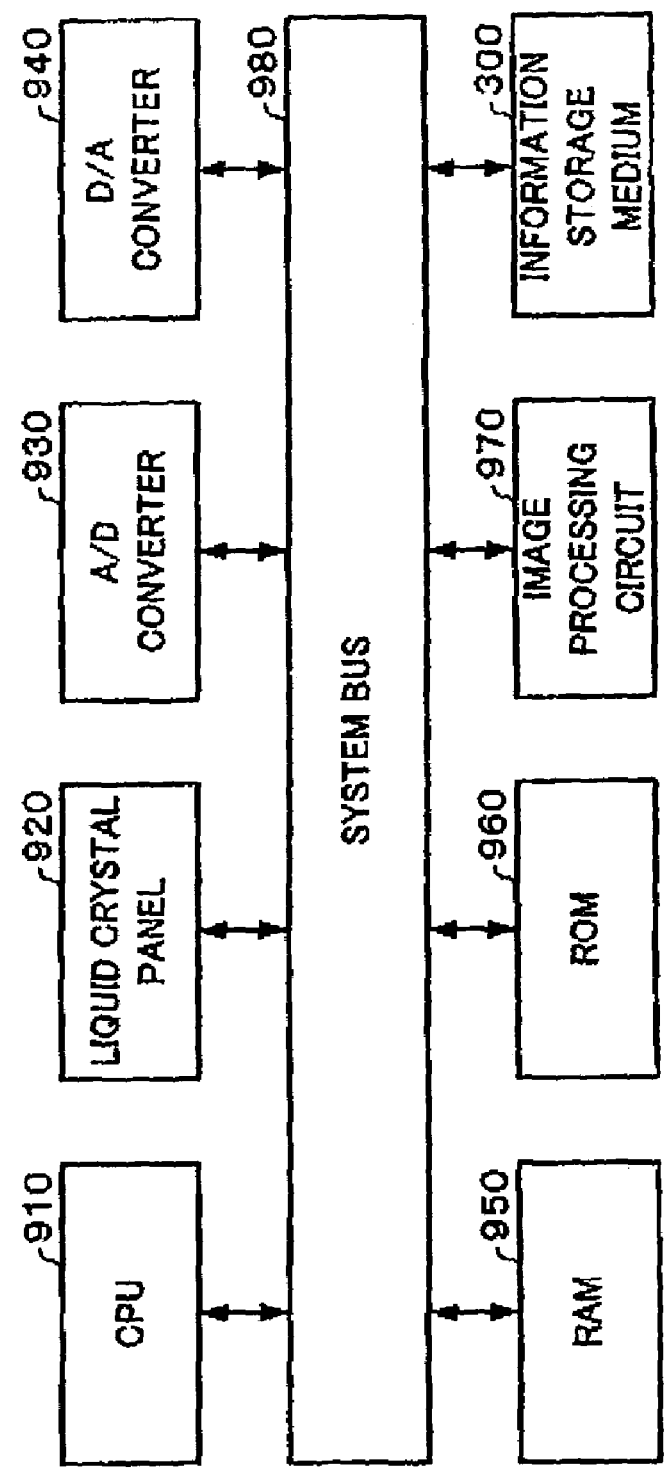
FIG. 4 is a hardware block diagram showing a projection type image display system in a liquid crystal projector according to one embodiment of the present invention.

FIG. 4 is a hardware block diagram showing a projection type image display system in a liquid crystal projector according to one embodiment of the present invention.

For example, the A/D converter section 112 may be implemented by an A/D converter 930 or the like; the D/A converter section 180 may be implemented by a D/A converter 940 or the like; the drive section 191 may be implemented by a ROM 960 or the like stored a liquid crystal light valve drive driver; the spatial light modulator 192 may be implemented by a liquid crystal panel 920 or a liquid crystal light valve or the like; the correction section 120, projection area selecting section 142, projectable area determination section 144, edge detection section 146, projection-range detection section 148, projection-area-to-pixel area association section 130, aspect-ratio determination section 132, sensing data generation section 170 or LUT generating section 160 may be implemented by an image processing circuit 970 or CPU 910 or the like; the calibration signal generation section 150 may be implemented by a RAM 950 or the like; and the sensor 60 may be implemented by a multi-pixel sensor which can derive X-, Y- and Z-values such as a CCD sensor or a CMOS sensor or the like. These components are configured to mutually deliver the information therebetween through a system bus 980. Moreover, these components could be implemented in a hardware manner such as circuits or in a software manner such as drivers.

In addition, these functions could be implemented by a computer within the liquid-crystal projector reading out a program from an information storage medium 300.

The information storage medium 300 could be a CD-ROM, DVD-ROM, ROM, RAM, or HDD, by way of example, and the method of reading the program therefrom could be a direct method or an indirect method.

Instead of the information storage medium 300, it is also possible to download a program that implements the above-described functions, from a host device over a network, in order to implement the above-described functions.

Modifications

Although one embodiment of the present invention has been described, the present invention is not limited to this embodiment.

For example, the projectable area determination section 144 determines the projectable area 30 based on the edge detection information in a sensed image from the edge detecting section 146 in the above embodiment, but the projectable area 30 may be determined based on information other than the edge detection information. The projectable area determination section 144 may determine the projectable area 30 based on color distribution in a sensed image.

Since the X-, Y- and Z-values relating to an obstacle such as the foliage plant 22 are different from the X-, Y- and Z-values in the projectable area 30 in the sensed image of FIG. 1, the projectable area 30 can be selected by detecting distribution of X-, Y- and Z-values representing colors. The technique of selecting the projectable area 30 based on color distribution will be described below.

Figure 5:
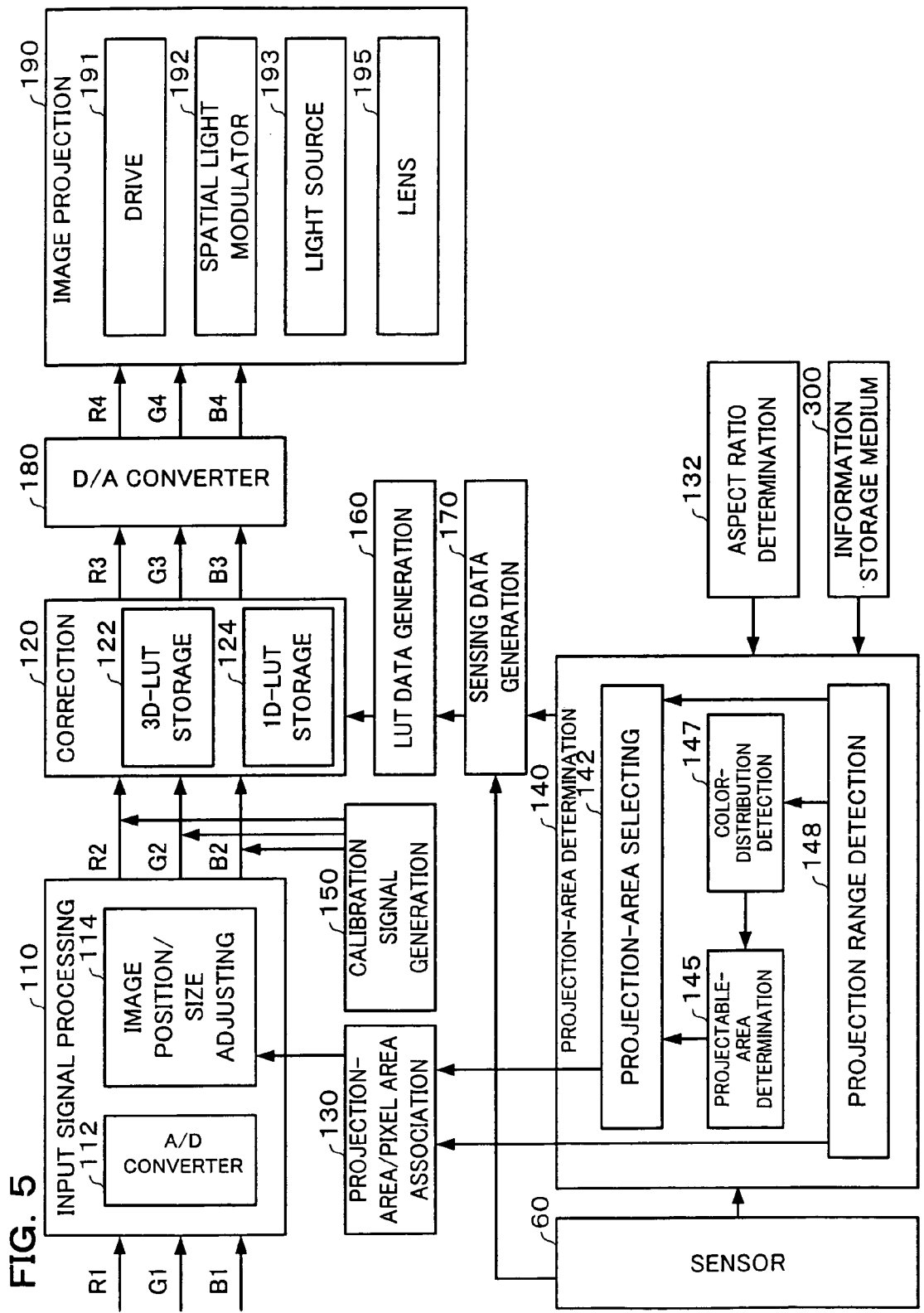
FIG. 5 is a functional block diagram showing another projection type image display system in a liquid crystal projector according to one embodiment of the present invention.

FIG. 5 is a functional block diagram of a projection type image display system in a liquid crystal projector according to one embodiment of the present invention.

In this embodiment, the edge detecting section 146 is replaced by a color-distribution detection section 147 which outputs detection information indicating color distribution in a sensed image (which may be the whole or part of the sensed image) from the sensor 60, and the projectable area determination section 144 is replaced by a projectable area determination section 145.

After the processing in the project region detection section 148 (step S2) described in connection with FIG. 3, the color-distribution detection section 147 detects color distribution in the project region 10A based on the sensing information (X-, Y- and Z-values) relating to a portion corresponding to the project region 10A in the sensed image.

More particularly, the color-distribution detection section 147 generates a histogram (or frequency distribution) of X-, Y- and Z-values for a predetermined image processing unit (such as one pixel or a pixel block including a fixed number of pixels in horizontal and vertical directions).

The color-distribution detection section 147 then detects a range of X-value (XP1-XP2) having upper frequency in the histogram of X value. Similarly, the color-distribution detection section 147 detects a range of Y-value (YP1-YP2) having upper frequency and a range of Z-value (ZP1-ZP2) having upper frequency. These ranges are optional, so they may be identical with one another or different from one another.

The color-distribution detection section 147 outputs the color-distribution information (XP1-P2, YP1-YP2 and ZP1-ZP2) toward the projectable area determination section 145.

The projectable area determination section 145 then determines the projectable area 30, based on an aspect ratio of an image from the aspect ratio determination section 132 and the detection information of color distribution from the color-distribution detection section 147.

Specifically, the projectable area determination section 145 selects an area AX having an X-value corresponding to the range of X-value (XP1-XP2) from the color-distribution detection section 147, based on the sensing information relating to the projection area 10A in the sensed image. Note that the sensing information has an ordinate position, an abscissa position, X-value, Y-value and Z-value for each coordinate position. Therefore, the projectable area determination section 145 can use the X-value as a search key to detect the ordinate and abscissa positions in the coordinates having the X-value, so that it can select the area AX. Areas AY and AZ for Y- and Z-values can be selected similarly.

According to such a procedure, the projectable area determination section 145 selects the area AX having the X-value in the range of X-value (XP1-XP2), the area AY having the Y-value in the range of X-value (YP1-YP2) and the area AZ having the Z-value in the range of Z-value (ZP1-ZP2) in addition to an area AA in which the areas AX, AY and AZ overlap each other (e.g., the projectable area 30 in FIG. 1).

In such a manner, the projectable area 30 can be selected. The remaining procedure portion may be accomplished by the steps after the above-mentioned step S3 in FIG. 3.

By using such a technique based on the color distribution, the liquid crystal projector according to this embodiment can select an area satisfying the aspect ratio from among an area which has the same color and is not been influenced (or influenced) by the environment, as a projection area, even if part of the projection target area 10 has been influenced by that environment (due to the fluorescent lamp 50 or the like).

The liquid crystal projector according to this embodiment can perform the processing more quickly (or more efficiently) since the edge detection can be omitted by adopting the technique based on the color distribution.

Note that the technique of detecting color distribution is not limited to the aforementioned technique. For example, the range of X-, Y- or Z-value may be determined by calculating these values with different coefficient values or by using a certain function. Moreover, the indexes for detecting color distribution may be in the form of R-, G- and B-values, other than the X-, Y- and Z-values.

When part of the projection target area 10 reflects no light projected from the liquid crystal projector, such as when the liquid crystal projector is used outdoors and part of the projection target area 10 is an empty space, or when the liquid crystal projector is used in a classroom and part of the projection target area 10 is a glass window, the liquid crystal projector may perform the following processing.

When the liquid crystal projector projects a rectangular image, the projection area can be determined by a process in which projecting and imaging of points or lines representing four corners of the rectangular image is repeatedly performed while narrowing the projection range, and the four corners in the sensed image is associated with the coordinates of the four corners in the spatial light modulator 192 at the point of detection of the points or lines representing the four corners by the sensor 60.

Although the liquid crystal projector in the above embodiment uses a monochromatic black calibration image for the edge detection or other processing, sensing information indicating differences between the X-, Y- and Z-values of a monochromatic white calibration image as a sensed image and the X-, Y- and Z-values of a monochromatic black calibration image as a sensed image may be used for the edge detection or other processing.

Even if the projection target area 10 is influenced by the environment differently by location, the liquid crystal projector can perform the detection of color distribution and the like in a state the difference is reduced.

The user's selection of the projection area may be carried out through a button or remote controller on the main body of the liquid crystal projector or through action or voice of the user.

Moreover, the liquid crystal projector according to this embodiment may perform the trapezoid skew correction or automatic focus adjustment when the image is projected.

Furthermore, the projection area may have any configuration other than the rectangle-shaped configuration as in the aforementioned embodiment, such as a circular configuration.

In addition, the liquid crystal projector of this embodiment may repeatedly perform such an image projection as shown in FIG. 9 at a predetermined timing (e.g., with a predetermined time interval or at a time point when one presenter is replaced by another).

Thus, the liquid crystal projector can automatically perform such an adjustment that the image can be projected onto a projection area having no obstacle by repeating the sensing and edge detection operations at a predetermined timing when the position of an obstacle has been changed, more particularly, when the projection area is hidden by audience. Thus, the user can more simply and easily change the projection position. The liquid crystal projector may further determine the projection area depending on the position of the obstacle.

In addition, the liquid crystal projector of this embodiment may repeat such a process as shown by steps S1 to S9 in FIG. 3 if the image processing of FIG. 3 is repeated at the predetermined timing. Alternatively, the liquid crystal projector may repeat such a process as shown by steps S3 to S9 by performing only the sensing operation for the projection target area 10 on non-display (or the projected black-colored calibration image) at step 1 and omitting the procedure of step S2.

In the former case, thus, the liquid crystal projector can not only perform such an adjustment that the image is projected onto a projecting area 40 having no obstacle, for example, when a new obstacle enters the projection area, but also project the image after it has been corrected for a new viewing environment when the older viewing environment has been changed. In the latter case, the liquid crystal projector can more simply and easily change the projection position without giving troublesome feelings to observers due to display of the colored calibration images, since the image can be projected onto the new projection area having no obstacle merely by performing the sensing operation for the projection target area 10 on non-display.

Although the preferred embodiment has been described as to the liquid crystal projector which determine the maximum projectable area 30 after one or more projection areas 40 satisfying the aspect ratio have been selected, one or more projection areas 40 satisfying the aspect ratio within the projectable area 30 may be selected after the projectable area 30 having no obstacle has been determined based on the edge detection data.

Although the preferred embodiment has been described as to the liquid crystal projector which generates the image correction data based on the mean value of X-, Y- and Z-values on the projection area determined by the projection area determination section 140, image correction data (e.g., 3D-LUT, 1D-LUT and the like) may be generated based on the mean value of the X-, Y- and Z-values for each selectable projection area (for example, each of the projection areas 40-1 to 40-3 shown in FIG. 1). It may be then stored to correction section 120. The input image information may be then corrected while switching one changing image correction data to be applied to another, depending on selection of the projection area.

Thus, the liquid crystal projector can apply the image correction data acceptable to the viewing environment within a reduced time period since it is not required to update the image correction data at each time when the projection area is changed, even though it is frequently changed.

The projection type image displaying system according to this embodiment may be applied to any one of various projectors such as a projector using a digital micromirror device (DMD) and the like, other than the aforementioned liquid crystal projector. For example, the aforementioned spatial light modulator may be in the form of an instrument consisting of a DMD tip and a color filter. By the way, DMD is a trademark possessed by the U.S. Texas Instruments. In addition, the projector is not limited to be of front projection type, but it may be of back projection type.

The present invention can effectively be used even when an image is projected in the business such as a meeting room, a medical building-site, an advertisement spot, an education spot, a movie theater, an exhibition ground, rather than for the aforementioned domestic living rooms.

In addition, the aforementioned function of the projector type image displaying system may be implemented by a single liquid crystal projector or by a plurality of distributed processing devices (e.g., a liquid crystal projector and personal computers).

What is claimed is:

1. A projection type image display system comprising:
   a sensing section which senses a projection target area and outputs sensing information;
   a detection section which performs edge detection based on the sensing information and outputting detection information which indicates edge in a sensed image;
   a projectable area determination section which determines a projectable area having no obstacle in the projection target area, based on the detection information;
   a projection area selection section which selects a projection area from the projectable area, based on selection by a user or a predetermined criterion;
   an adjustment section which adjusts input image information such that an image is displayed on the projection area;
   an image correction data generation section which generates image correction data used to correct the image depending on viewing environment, based on the sensing information;
   a correction section which corrects color and brightness of the input image information, based on the image correction data; and
   an image projection section which projects an image onto the projection area based on the input image information corrected by the correction section.

2. The projection type image display system as defined in claim 1, wherein:
   the image correction data generation section detects viewing environment of the projection area and generates the image correction data, based on the sensing information of the projection area selected by the projection area selection section.

3. The projection type image display system as defined in claim 2, wherein:
   the image projection section has a spatial light modulator; and
   the adjustment section associates the projection target area based on the sensing information with a pixel area of the spatial light modulator to adjust the input image information so that the position of an image is adjusted.

4. The projection type image display system as defined in claim 3, wherein:
   the sensing section repeatedly performs the sensing operation at a predetermined timing and outputs the sensing information;
   the detection section outputs the detection information based on the newest sensing information; and
   the projectable area determination section determines the projectable area based on the newest detection information.

5. The projection type image display system as defined in claim 2, wherein:
   the image projection section has a spatial light modulator; and
   the adjustment section associates the projection target area based on the sensing information with a pixel area of the spatial light modulator to adjust the input image information so that the size of an image is adjusted.

6. A projection type image display system comprising:
   a sensing section which senses a projection target area and outputs sensing information;
   a detection section which performs color-distribution detection based on the sensing information and outputs detection information which indicates color distribution in a sensed image;
   a projectable area determination section which determines a projectable area having no obstacle in the projection target area, based on the detection information;
   a projection area selection section which selects a projection area from the projectable area, based on selection by a user or a criterion;
   an adjustment section which adjusts input image information such that an image is displayed on the projection area;
   an image correction data generation section which generates image correction data used to correct the image depending on viewing environment, based on the sensing information;
   a correction section which corrects color and brightness of the input image information, based on the image correction data; and
   an image projection section which projects an image onto the projection area based on the input image information corrected by the correction section.

7. A computer-readable storage medium storing computer-executable instructions, wherein said computer-executable instructions cause a computer to function as:
   a sensing section which senses a projection target area and outputting sensing information;
   a detection section which performs edge detection based on the sensing information and outputs detection information which indicates edge in a sensed image;
   a projectable area determination section which determines a projectable area having no obstacle in the projection target area, based on the detection information;
   a projection area selection section which selects a projection area from the projectable area, based on selection by a user or a predetermined criterion;
   an adjustment section which adjusts input image information such that an image is displayed on the projection area;
   an image correction data generation section which generates image correction data used to correct the image depending on viewing environment, based on the sensing information;
   a correction color section which corrects and brightness of the input image information, based on the image correction data; and
   an image projection section which projects an image onto the projection area based on the input image information corrected by the correction section.

8. The computer-readable storage medium as defined in claim 7, wherein:
   wherein the image correction data generation section detects viewing environment of the projection area and generates the image correction data, based on the sensing information of the projection area selected by the projection area selection section.

9. The computer-readable storage medium as defined in claim 8, wherein:
the image projection section has a spatial light modulator; and
the adjustment section associates the projection target area based on the sensing information with a pixel area of the spatial light modulator to adjust the input image information so that the position and of an image is adjusted.

10. The computer-readable storage medium as defined in claim 9, wherein:
the sensing section repeatedly performs the sensing operation at a predetermined timing and outputs the sensing information;
the detection section outputs the detection information based on the newest sensing information; and
the projectable area determination section determines the projectable area based on the newest detection information.

11. The computer-readable storage medium as defined in claim 8, wherein:
the image projection section has a spatial light modulator; and
the adjustment section associates the projection target area based on the sensing information with a pixel area of the spatial light modulator to adjust the input image information so that the size of an image is adjusted.

12. An image projection method comprising:
sensing a projection target area to output sensing information;
performing edge detection based on the sensing information and outputting detection information which indicates edge in a sensed image;
determining a projectable area having no obstacle in the projection target area, based on the detection information;
selecting a projection area from the projectable area based on user selection or a predetermined criterion;
adjusting input image information such that an image is displayed on the projection area;
generating image correction data used to correct the image depending on viewing environment, based on the sensing information;
correcting color and brightness of the input image information, based on the image correction data; and
projecting an image onto the projection area based on the input image information in which color and brightness are corrected.

13. The image projection method as defined in claim 12, further comprising:
detecting viewing environment of the projection area and generating the image correction data, based on the sensing information of the selected projection area.

14. The image projection method as defined in claim 13, further comprising:
associating the projection target area based on the sensing information with a pixel area of a spatial light modulator to adjust the position of an image.

15. The image projection method as defined in claim 14, further comprising:
repeatedly performing the sensing operation and outputting the detection information at a predetermined timing; and
determining the projectable area based on the newest detection information.

16. The image projection method as defined in claim 13, further comprising:
associating the projection target area based on the sensing information with a pixel area of a spatial light modulator to adjust the size of an image.

17. A computer-readable storage medium storing computer-executable instructions, wherein said computer-executable instructions cause a computer to function as:
a sensing section which senses a projection target area and outputting sensing information;
a detection section which performs color-distribution detection based on the sensing information and outputs detection information which indicates color distribution in a sensed image;
a projectable area determination section which determines a projectable area having no obstacle in the projection target area, based on the detection information;
a projection area selection section which selects a projection area from the projectable area, based on selection by a user or a predetermined criterion;
an adjustment section which adjusts input image information such that an image is displayed on the projection area;
an image correction data generation section which generates image correction data used to correct the image depending on viewing environment, based on the sensing information;
a correction section which corrects color and brightness of the input image information, based on the image correction data; and
an image projection section which projects an image onto the projection area based on the input image information corrected by the correction section.

18. An image projection method comprising:
sensing a projection target area to output sensing information;
performing color-distribution detection based on the sensing information and outputting detection information which indicates color distribution in a sensed image;
determining a projectable area having no obstacle in the projection target area, based on the detection information;
selecting a projection area from the projectable area based on user selection or a predetermined criterion;
adjusting input image information such that an image is displayed on the projection area;
generating image correction data used to correct the image depending on viewing environment, based on the sensing information;
correcting color and brightness of the input image information, based on the image correction data; and
projecting an image onto the projection area based on the input image information in which color and brightness are corrected.

* * * * *